Feb. 2, 1926.
G. E. FENNER
ARTIFICIAL BAIT
Filed April 2, 1925
1,571,770
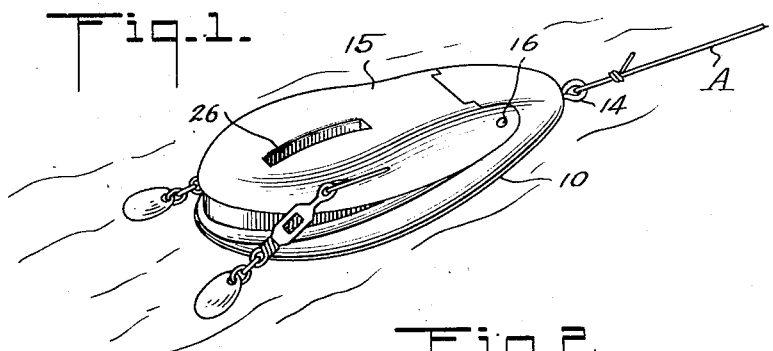
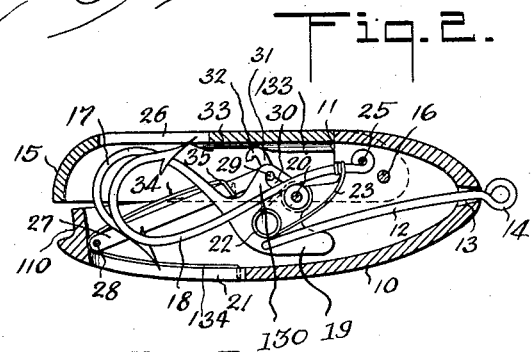
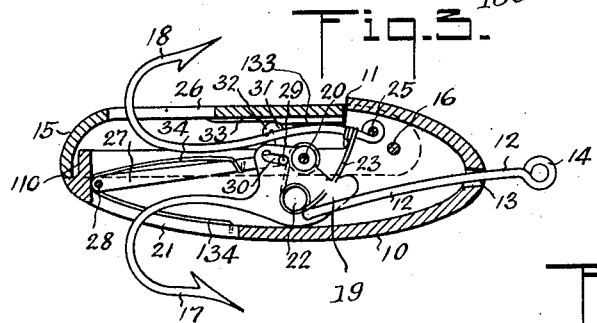
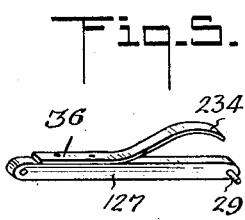
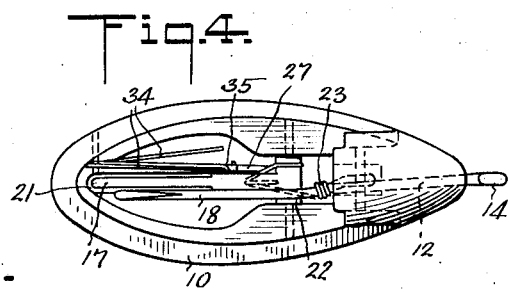
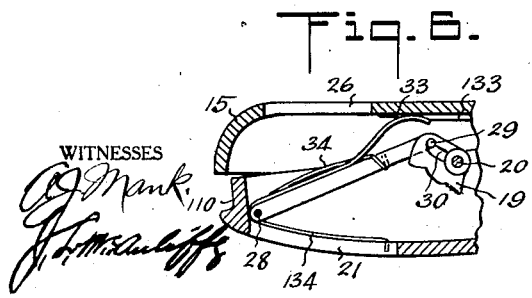
INVENTOR
GEORGE E. FENNER
BY
ATTORNEYS Patented Feb. 2, 1926.

1,571,770

UNITED STATES PATENT OFFICE.

GEORGE E. FENNER, OF OXFORD, WISCONSIN.

ARTIFICIAL BAIT.

Application filed April 2, 1925. Serial No. 20,235.

*To all whom it may concern:*

Be it known that I, GEORGE E. FENNER, a citizen of the United States, and a resident of Oxford, in the county of Marquette and State of Wisconsin, have invented a new and Improved Artificial Bait, of which the following is a full, clear, and exact description.

My invention relates to an artificial fishing bait, and more particularly to a bait in which the hooks are ordinarily guarded and the barbs thereof housed, but in which the hooks become exposed upon the bait being taken by a fish.

The general object of my invention is to provide an artificial bait equipped with hooks and novel means whereby the hooks will be caused to hook into the fish upon the bait being attacked.

The present invention is designed more particularly as an improvement on the artificial bait forming the subject matter of the United States Patent No. 1,466,616, granted to me August 28, 1923.

The particular object of the present invention is to provide an assemblage involving a pair of hooks, both of which are pivoted and move to the exposed position as distinguished from the patented assemblage, which embodies a fixed and a movable hook.
The nature of my present invention and its distinguishing features and advantages will more clearly appear as the description proceeds.

Reference is to be had to the accompanying drawings forming a part of this specification, it being understood that the drawings are merely illustrative of one example of the invention.

Figure 1 is a perspective view of an artificial bait embodying my invention.

Figure 2 is a longitudinal, vertical section thereof shown with the hooks in the housed position.

Figure 3 is a view similar to Figure 2, but showing the housing sections collapsed and the hooks spread.

Figure 4 is a plan view with a section of the housing removed.

Figure 5 is a perspective view of a modified form of the hook-operating lever.

Figure 6 is a fragmentary, longitudinal, vertical section showing a portion of the bait with the lever shown in Figure 5.

In carrying out my invention in accordance with the illustrated example, the bait is formed with a body 10 cut away at the upper side as at 11. A short length of wire 12 extends through a hole 13 in the end of the body 10 to the hollow interior of said body and is formed at the outer end with an eye 14 for the attachment of a fish line A.

A housing section 15 is pivotally secured by a transverse pin 16 to the main body 10 of the housing, so that said section 15 and the housing body are movable relatively toward each other so that the housing may collapse at the rear end. The body 10 at the rear end has a rabbet 110 receiving the edge of the housing section 15.

Two hooks 17, 18 are employed in the assemblage. One hook 17 has a flattened area 19 at the front end of the shank of the hook and at said flattened portion the hook is pivotally secured to the body 10 by a transverse pin 20 so that the hook may swing through an opening 21 in the body 10 near the rear end to assume a position beyond the body surface or to house within the body 10 and section 15. The flattened portion 19 has a lateral stud 22, about which is coiled one end of a spring 23. The other end of the spring 23 is coiled about the shank of the other hook 18. The inner end of the rod 12 within the housing body 10 is pivotally connected, with the flattened portion 19 of hook 17 adjacent the lateral stud 22. The shank of the hook 18 is pivoted at its forward end, as at 25, to the housing body 10, so that said hook may move outwardly through an opening 26 in the housing section 15.

The assemblage includes furthermore a lever 27 pivoted at its rear, as at 28, to the housing body 10 and said lever extends forwardly alongside of the hook 17 to a point adjacent the pivot 20 of said hook. On the lever 27 is a lateral pin 29 which extends through a slot 30 formed in the flattened portion 19 of the hook 17. In the form shown in Figures 1 to 4, lever 27 has a lateral arm 31 which has a rounded end 32 bearing against a cam surface 33 formed upon the housing 15 at the interior. The lever 27 is under the pressure of a spring 34 which ranges along a side of said lever and engages the lever by means of a hook-shaped terminal 35 bearing against said lever. The spring (34) extends about the pivoted end of lever 27 and along the interior of the housing body 10, as at 134.

With the above described construction, when the device is in practical use and attached to the fish line A and with the hooks housed as in Figure 2, the drag of the bait on the line in no way affects the hooks and the bait remains in the condition with the hooks housed. No outward movement of the hooks can occur until the housing is collapsed by the fish taking hold of the bait at the rear end and pressing the section 15 toward the body 10. In this relative collapsing movement of the body 10 and section 15, the lever 27 will be rocked on its pivot 28 and during the rocking movement the pin 29 will be permitted movement in the slot 30. At the same time the rounded end of the lateral arm 31 will ride along the cam surface 33 and upward to the raised portion 133 of the cam surface. It will be observed from Figure 3 that a notch 130 is complementary to the slot 30 at one side thereof, and in the housed position of the hooks the pin 29 is in said notch 130. As the pin moves out of the notch 130 by the rocking of the lever 27, said pin bears against a side wall of the slot 30 and the result is that the hook 17 is rocked on its pivot 20 until the hook projects beyond the outer surface of the housing body 10 and enters the gills of the fish, the housing assuming collapsed position by the fish taking hold of the rear end thereof. During the swinging movement of the hook 17, the spring 23 will act as a link or an essentially rigid connection between the two hooks and, therefore, the hook 18 will be drawn outwardly by the outward movement of the hook 17. A material force also causing the hook 17 to move outwardly after the lever 27 has moved out of the notch 130, is the drag on the line due to the bait and the resistance of the fish, which results in the pull on the line being effective on the hook 17 at the pivot 24. Thus it will be seen that both hooks are positively expanded to an outward position to penetrate the gills of the fish.

In the form shown in Figures 5 and 6 the lever 127 has a stiff spring 234 secured thereto. The free end of the spring 234 bears yieldingly against the cam surface designated 33 with the raised portion 133 and its purpose is to have a cushioning effect and protect the mechanism from injury. The spring 34 exerts a force which acts through the lever 127 to return the parts to the inner normal position.

Spring 23 tends to move hook 18 outwardly and also tends to return said hook 18 to normal position.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. In an artificial bait, a housing comprising a body and a section pivoted to the body to collapse or expand the housing, a hook pivoted to the body, the body having an opening through which the hook may pass to an outer exposed position for engaging in a fish taking the bait or to a position within the housing, an element pivotally connected with said hook and adapted to connect with a fish line, a spring-pressed lever pivoted to the housing and having a slot-and-pin connection with said hook, a cam on the pivoted housing section, a member on said lever in contact with said cam and adapted to ride along the same for releasing said hook, and a second hook pivoted to the housing, the pivoted housing section having an opening through which said second hook may be projected, and a spring connecting the first hook with the shank of the second hook.

2. In an artificial bait, a housing comprising a body and a section pivoted to the body to collapse or expand the housing, a hook pivoted to the body, the body having an opening through which the hook may pass to an outer exposed position for engaging in a fish taking the bait or to a position within the housing, an element pivotally connected with said hook and adapted to connect with a fish line, a spring-pressed lever pivoted to the housing and engaging said hook, a cam on the pivoted housing section with which cam said lever is in contact, and spring means tending to throw said hook outwardly and forming a connection between the hooks to cause a movement of one hook to impart a corresponding movement to the other hook

GEORGE E. FENNER.